US011421848B2

(12) United States Patent
Simchak (10) Patent No.: US 11,421,848 B2
(45) Date of Patent: Aug. 23, 2022

(54) SYSTEM PROVIDING FUNCTIONAL LIGHTING THROUGH AN OPAQUE FINISH

(71) Applicant: Flex-N-Gate Advanced Product Development, LLC, Tecumeseh (CA)

(72) Inventor: Jeffrey Simchak, Dexter, MI (US)

(73) Assignee: Flex-N-Gate Advanced Product Development, LLC

( * ) Notice: Subject to any disclaimer, the term of this patent is extended or adjusted under 35 U.S.C. 154(b) by 0 days.

(21) Appl. No.: 17/172,656

(22) Filed: Feb. 10, 2021

(65) Prior Publication Data
US 2021/0247045 A1    Aug. 12, 2021

Related U.S. Application Data

(60) Provisional application No. 62/972,309, filed on Feb. 10, 2020.

(51) Int. Cl.
*F21S 43/20* (2018.01)
*F21W 103/20* (2018.01)
*F21W 103/35* (2018.01)

(52) U.S. Cl.
CPC ............ *F21S 43/26* (2018.01); *F21S 43/255* (2018.01); *F21W 2103/20* (2018.01); *F21W 2103/35* (2018.01)

(58) Field of Classification Search
CPC ........ F21S 43/20; F21S 43/235; F21S 43/236; F21S 43/237; F21S 43/239; F21S 43/241; F21S 43/242; F21S 43/243; F21S 43/245; F21S 43/247; F21S 43/249; F21S 43/251; F21S 43/255; F21S 43/26; F21S 43/27; F21W 2103/00; F21W 2103/10; F21W 2103/15; F21W 2103/20; F21W 2103/25; F21W 2103/30; F21W 2103/35; F21W 2103/40; F21W 2103/45; F21W 2103/50; F21W 2103/55; F21W 2103/60
See application file for complete search history.

(56) References Cited

U.S. PATENT DOCUMENTS

| | | | |
|---|---|---|---|
| 4,241,388 A | * | 12/1980 | Green ................. F21S 43/40 362/516 |
| 4,656,567 A | | 4/1987 | Morris |
| 4,835,666 A | | 5/1989 | Feger et al. |
| 5,373,280 A | | 12/1994 | Louy et al. |
| 5,555,492 A | | 9/1996 | Ferger |
| 6,170,971 B1 | | 1/2001 | Godbillon |
| 6,533,439 B1 | | 3/2003 | Duflos et al. |
| 2019/0003676 A1 | | 1/2019 | Franc et al. |

FOREIGN PATENT DOCUMENTS

| | | |
|---|---|---|
| CA | 2742806 A1 | 5/2010 |
| DE | 4203253 A1 | 8/1992 |

OTHER PUBLICATIONS

PCT Patent Application No. PCT/IB2021/000071 International Search Report and Written Opinion dated Jun. 14, 2021.

* cited by examiner

*Primary Examiner* — Robert J May
(74) *Attorney, Agent, or Firm* — Erise IP, P.A.

(57) ABSTRACT

Disclosed is a system for making a vehicle lamp have an overall solid occluded appearance when the lamp is inactive, and allowing for the passage and optional filtering of light when the lamp is on. A light modifier is created that has optical elements on an inside surface, and an opaque or translucent covering on an opposite side of the modifier. The optical elements and corresponding apertures are aligned with each other and diversely configured.

20 Claims, 11 Drawing Sheets

SYSTEM PROVIDING FUNCTIONAL LIGHTING THROUGH AN OPAQUE FINISH

RELATED APPLICATIONS

This application claims the benefit of U.S. Provisional Patent Application No. 62/972,309 filed Feb. 10, 2020, the entire contents of which are herein incorporated by reference.

BACKGROUND

1. Technical Field

This disclosure relates to lighting. More specifically, the disclosure relates to providing functional illumination through opaque components.

2. Discussion of Related Art

It is known in the art to incorporate light blocking or filtering with a vehicle indicator or other lights. See, e.g., U.S. Pat. No. 4,835,666 issued to Feger et al.; U.S. Pat. No. 5,555,492 issued to Feger; and U.S. Pat. No. 6,533,439 issued to Duflos et al. For example, the earlier Feger publication shows the use of an internal carrier disc that includes lenses intended to refract a maximum of the light emitted by the lamp through gaps created through opaque stripes. When the lamp is dark, the stripes create a diffuse effect, and the hue of the glass cover is reinforced by making it darker. The later Feger publication and the Duflos publication each disclose light filtering arrangements that take collimated light sources and then use optical elements to accomplish different objectives.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

Embodiments include a system having a light source directed into a light modifier where a plurality of optical elements on the side of the modifier that facing the light source. An opaque or translucent covering on an opposite side of the modifier and a plurality of diversely-configured apertures located on the opposite side of the modifier. In embodiments, each aperture has a width, and the plurality of diversely-configured optical elements configured to direct light through each of the plurality of diversely-configured apertures for the purpose of accomplishing a lighting application.

In some embodiments, the apertures are slots, holes, or other shapes. In yet other embodiments, the aperture is a hole, and the optical element is configured to focus on an area or point in the hole. In other embodiments a first of the plurality of apertures is a slot, and a first optical element in the plurality of optical elements is a flute configured to focus through the slot; and a second of the plurality of apertures is a hole, and a second optical element in the plurality of optical elements is configured to focus through the hole.

In embodiments, the light source and light modifier are incorporated into a vehicle light. In more specific embodiments the vehicle light is a signal light. In some embodiments, the plurality of optical elements and apertures enable a first mode wherein the light source is active and light is transmitted through the plurality of apertures and a second dark mode wherein the modifier creates a solid appearance. The solid appearance can be is metallic, e.g., resemble brushed aluminum. In embodiments the plurality of optical elements and apertures include diverse patterns creating different optical effects at different locations on the modifier.

In other embodiments, the plurality of slots includes at least one curved slot, and the plurality of optical elements includes at least one curved flute following the curved slot, the curved flute being configured to emit light through the curved slot. In other embodiments, the optical elements form concentric circles and the apertures are formed as concentric circles on the opposite side of the modifier. In embodiments, the optical elements and apertures form an upper portion of a taillight and are colored red configured to operate as a brake light. The optical elements and apertures can also be S-shaped. In embodiments, the optical elements and apertures form a central yellow colored portion of the system and are configured to operate as a turn signal.

In terms of size, the aperture widths can be in the range of 10-250 microns; in the range of 10-100 microns; less than 20 microns; or about 63 microns.

In an alternative embodiment, a vehicle lamp is disclosed. The lamp has an inner lens including an inner optical element; an outer lens including an opaque or translucent covering on an inside surface; an aperture formed in the opaque or translucent covering on the outer lens, the inner optical element configured to focus light through the aperture. In embodiments the outer lens includes an outer optical element on the outside surface of the outer lens. The aperture can extend through the opaque or translucent covering and through the outer lens.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the preferred embodiments. In the drawings, the sizes and thicknesses of layers, regions, objects and features may be exaggerated for clarity.

DETAILED DESCRIPTION

Disclosed are a system and a method for creating functional lighting through a seemingly opaque surface finish. While remaining substantially opaque, optical elements formed on the back of a lens focus light into apertures, which might be slots or holes formed into the opaque finish allowing passage therethrough to accomplish numerous functional, ornamental, as well as other objectives. The term "aperture" as used herein means an opening formed through something. The term should not, without being further defined in the claims, be construed as requiring any particular shape.

The outside opaque surface finish could be a paint (e.g., metallic, non-metallic, fully opaque, semi-transparent, etc.), a hard coating (e.g., UV hard coats, or numerous other protective coatings), a combination of a coating or paint, or any other opaque substance. The terms "opaque" or "opacity" referred to hereinafter in general should be consider as also including arrangements where an item is substantially opaque, and even moderately opaque in some circumstances. The opaque substance discussed is merely meant as indication of opacity relative to some other thing, e.g., an opening or relatively transparent portion.

Figure 1:
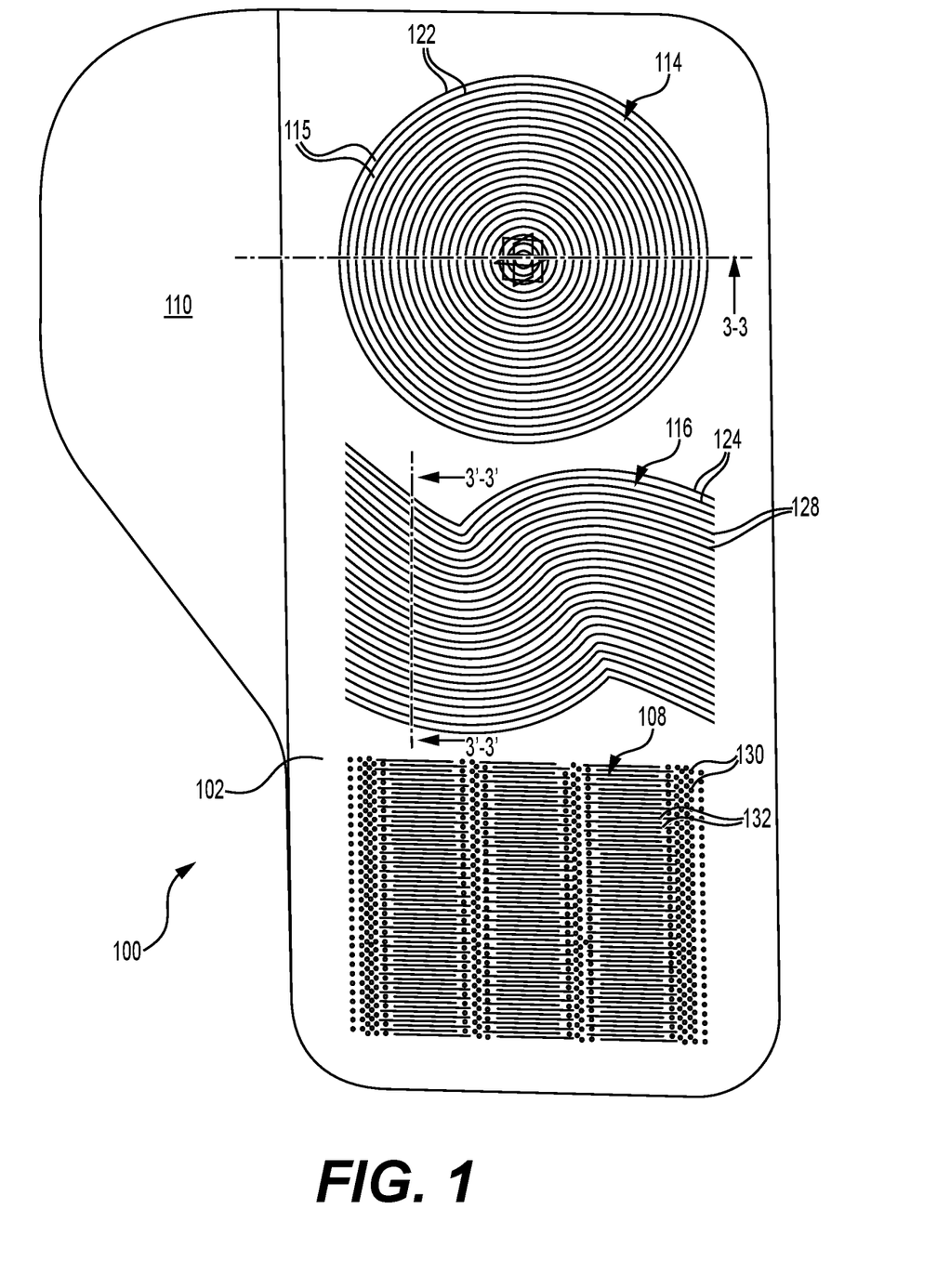
FIG. 1 shows a perspective view of an exterior side of a bezel/lens arrangement for a tail-light embodiment.

A first embodiment of a lighting arrangement including a particular lens (bezel) is shown in FIG. 1. FIG. 1 is a perspective view of the exterior of the lighting unit, e.g., for use on a vehicle as a taillight system. A face 102 of the unit includes an upper concentric circular arrangement 104, a middle curved arrangement 106, and a lower diverse arrangement portion 108. In embodiments, the upper arrangement 104 is used to execute a stop lighting function, the middle arrangement 106 is used to execute a turn/blinker function, and the lower arrangement 108 is used to execute a tail function. Those skilled in the art will recognize, however, that these technologies could be used for numerous other kinds of lighting applications, functional, ornamental, or otherwise, and the FIG. 1 version should not be considered in any way limiting.

The FIG. 1 embodiment also includes an outwardly-angled side portion 110. The face 102 and angled side 110 are, in embodiments, designed to conform into a local and general automobile configuration.

The top concentric-circular arrangement 104 is substantially occluded, but includes a plurality of concentrically-circular slots 112 used to transmit light, as will be discussed hereinafter. Each circular slot is separated from the next by concentric-circular opaque portions 115. The circular slots 112 and occluded portions 144 can be formed in a variety of ways. In one embodiment, the lens is molded of clear material, and then masked with the occlusive portions via printing or the use of a molded mask. In other embodiments, the complete unit (both of outside face 102 and angled side 110) can be completely masked by a painting or printing process, then the deposited material at the locations of slots 112 can be etched away (according to known processes) to provide the selected transparency. Additionally, the lens material upon which opaque material is deposited can be formed of a functional color such that once the slots are formed, there is a match, e.g., the lens for the upper radial pattern 104 and the lower pattern 108 could be colored red (for stop and tail functions), whereas the lens material for the middle portion 106 could be formed of yellow material in order to execute a turn function. Alternatively, the coloration could be created by depositing transparent coatings on the slits (or holes) created.

Figure 2:
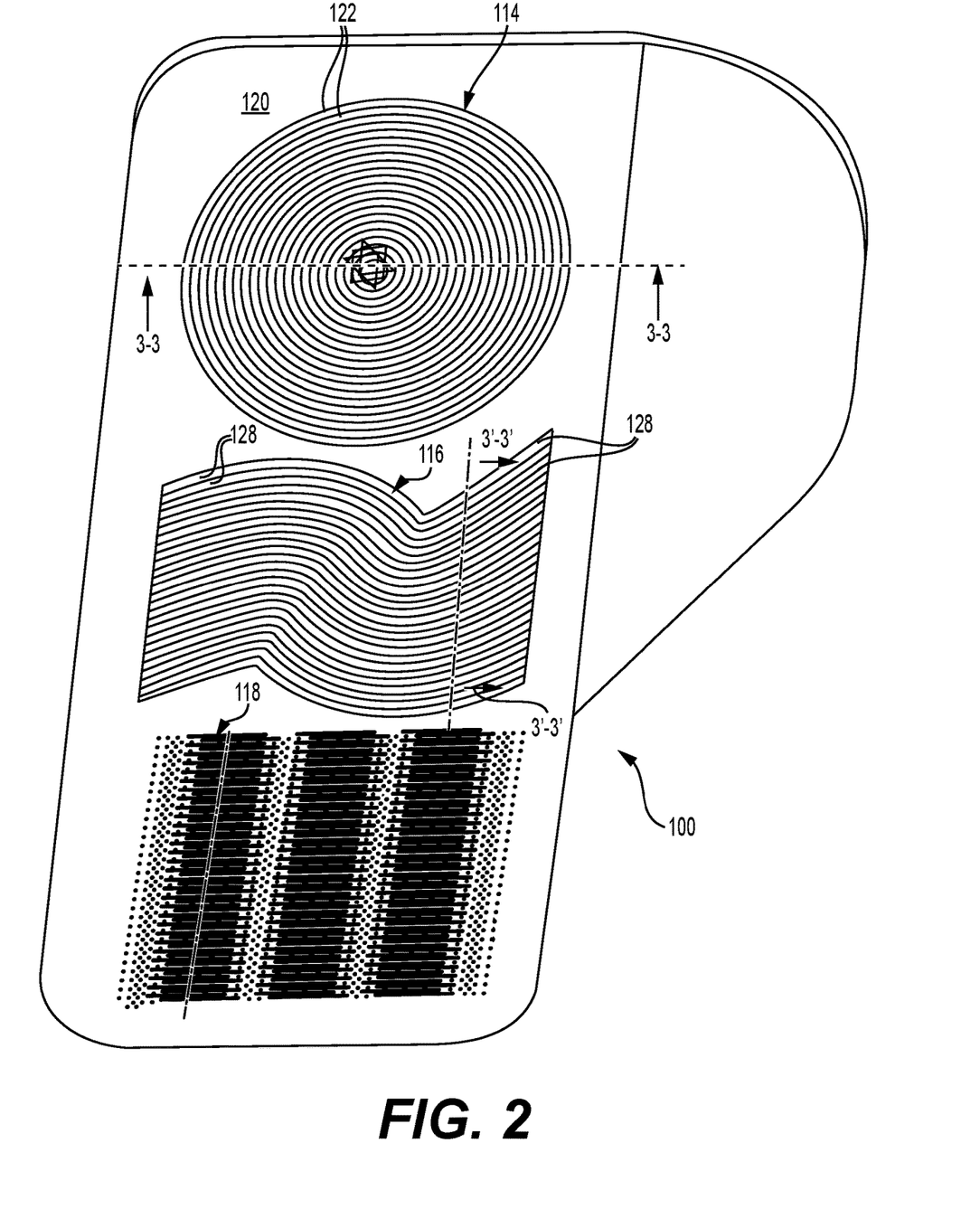
FIG. 2 shows a perspective view from the inside of the bezel/lens arrangement for the taillight embodiment of FIG. 1.

The reverse side of the top radial arrangement 104 can be seen in FIG. 2, which reveals a perspective view from the inside of the bezel/lens arrangement for the taillight embodiment of FIG. 1. The optical arrangement 114 extends out from an inside surface 120 of the housing in the form of a plurality of radiating flutes 122. Also extending out from the inside surface 120 are middle and lower optical arrangements 116 and 118, configured to focus light through the slits and/or apertures existing in the curved middle and diverse lower arrangements 106 and 108. Each of the flutes extends in line with and is centered over each radial slot 112. In the top optical arrangement 104, each flute 122 is optically rendered to focus light to create a line in the space defined by each slot 112.

Figure 3:
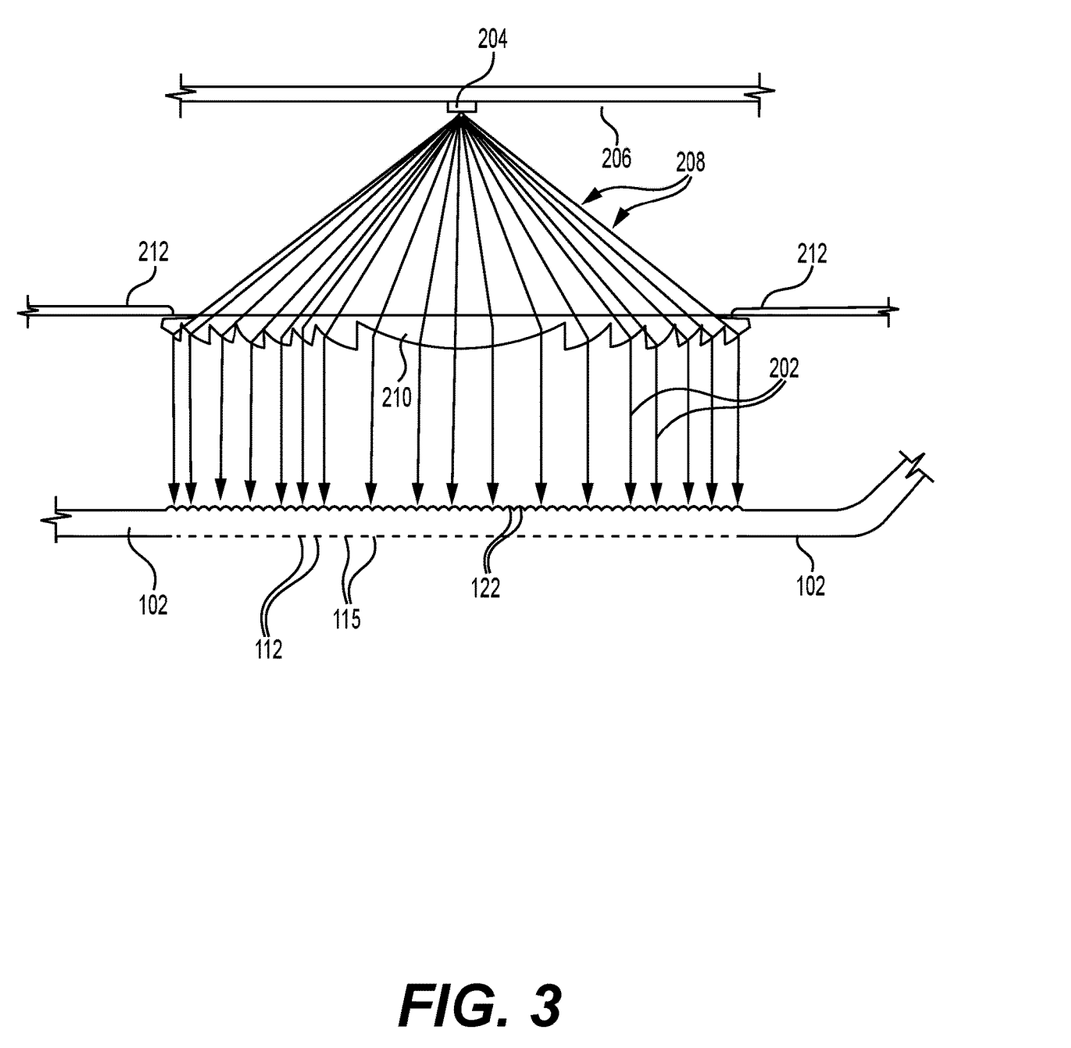
FIG. 3 is a cross-sectional view for an embodiment of the overall illumination system, including the components providing collimated light for supporting the radial pattern portion of the bezel/lens arrangement of FIGS. 1 and 2.

In embodiments, it is desirable to provide collimated light for supporting the radial pattern portions of the bezel/lens arrangement shown in FIGS. 1 and 2. FIG. 3 is a representation of cross-sectional 3-3 (see FIG. 1) taken to some depth into the housing behind the lamp 100. Referring to FIG. 3, it can be seen how a collimated source of light 202 is provided to the optical arrangement 122. More specifically, light is generated, in the FIG. 3 embodiment, using one or more LEDs 204 mounted on a substrate 206 (e.g., PCB). As those skilled in the art will be aware, LEDs typically emit light in a Lambertian pattern 208. In order to create collimated source 202, a Fresnel lens 210 is fixed into the light housing using securement means 212 (but could be fixed in any number of ways) having a center axis in alignment with the center emission axis of the LED 204. Once collimated, the light 202 is modified using the optical elements 122 (e.g., circular flute-like elements). More specifically, each optical element 122 is focused such that the light passes through the slots 112 (or apertures depending on the embodiment).

Figure 4:
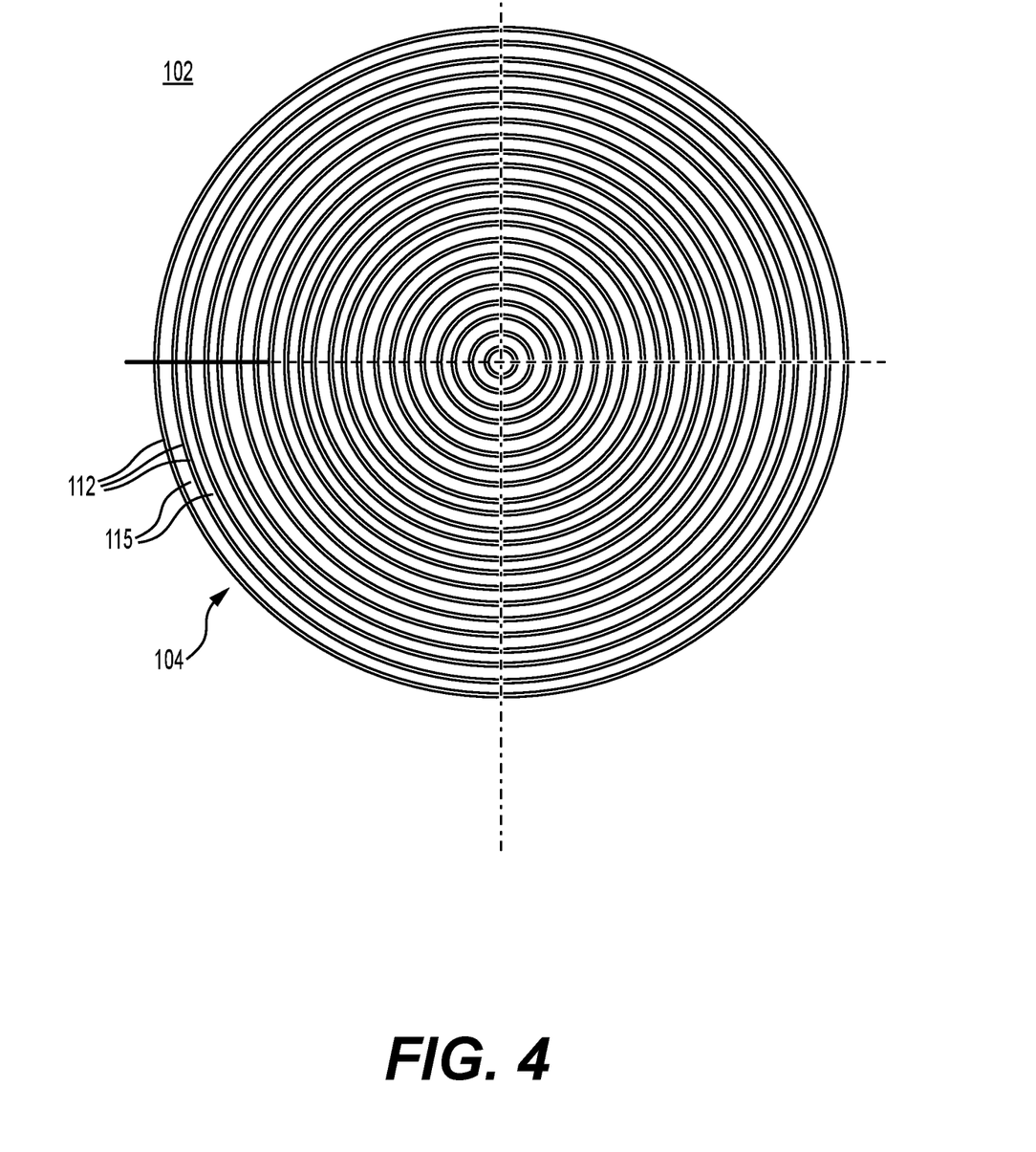
FIG. 4 shows a front view of the radial pattern revealing slots through which focused light is emitted.

The slots 112 and occluding circles 115 can be seen in greater detail in FIG. 4, which is a front view of the upper arrangement 104. FIG. 4 shows a front view of the radial pattern revealing slots 112 through which focused light is emitted. The widths of the slots 112 are wide enough to allow for the focused passage of light, but minimized such that from a reasonable distance, the slot-including arrangement 104 (when not illuminated) appears the same as the surrounding portions 102 of the unit which are fully painted. At the same time, the lamp allows for functional lighting by passing the light through the slots 112.

Figure 5:
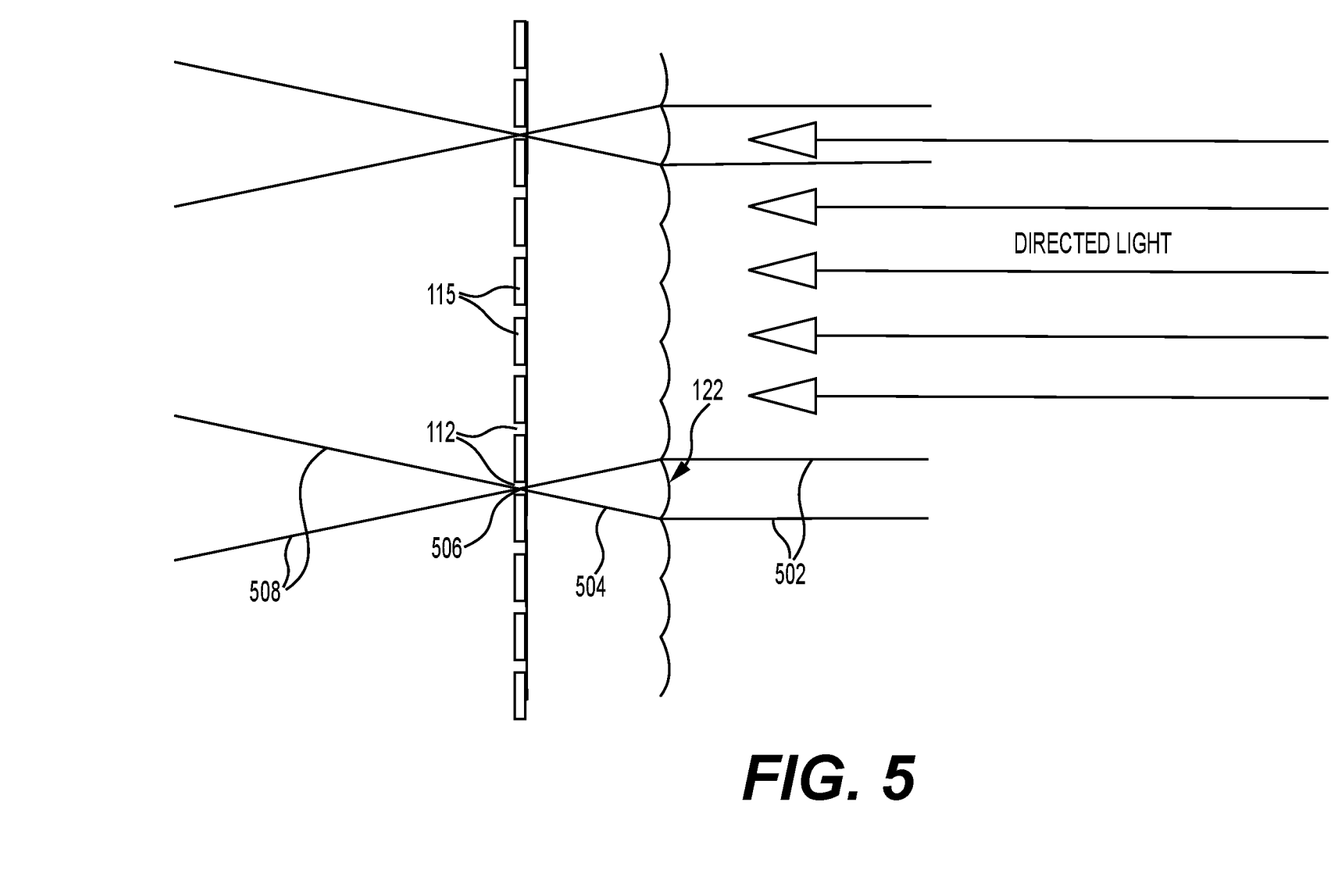
FIG. 5 is a section functional view showing focusing of light through the openings in the opaque material deposited.

FIG. 5 is a reproduction of a portion of Sectional 3-3 blown up to show more detail regarding the fluted optical elements, and how they focus the collimated light through the slots (or apertures). Referring to the figure, it can be seen that the boundaries 502 of a collimated portion of light emitted from the one or more LEDs is introduced into each optical element 122. The element then converges the light (see narrowing boundaries 504) towards a focal point 506. Focal point 506 for each optical element is located substantially at a point centered in the gap (slot) created between each of the occluding circles (appearing in rectangular cross section in FIG. 5). After focal point 506, the light then diverges outward according to a boundary 508. This enables the light to be utilized to, e.g., signal, indicate a condition, or any other function.

The middle arrangement 106 shown in FIG. 1 includes S-shaped slots 124 (or gaps) made inside corresponding S-shaped occluding strips 126. In looking at FIG. 2, it can be seen that a corresponding S-shaped optical element 128 (e.g., flute) follows exactly and is centered over each slot shown on the opposite side in FIG. 1. And all along the length of each S-shaped slot 124, each corresponding S-shaped optical element 128 on the back focuses collimated light received through the middle of the gap. Thus, like with the top arrangement 104, the middle arrangement is able to perform designated functionality (e.g., turn functions).

Figure 6:
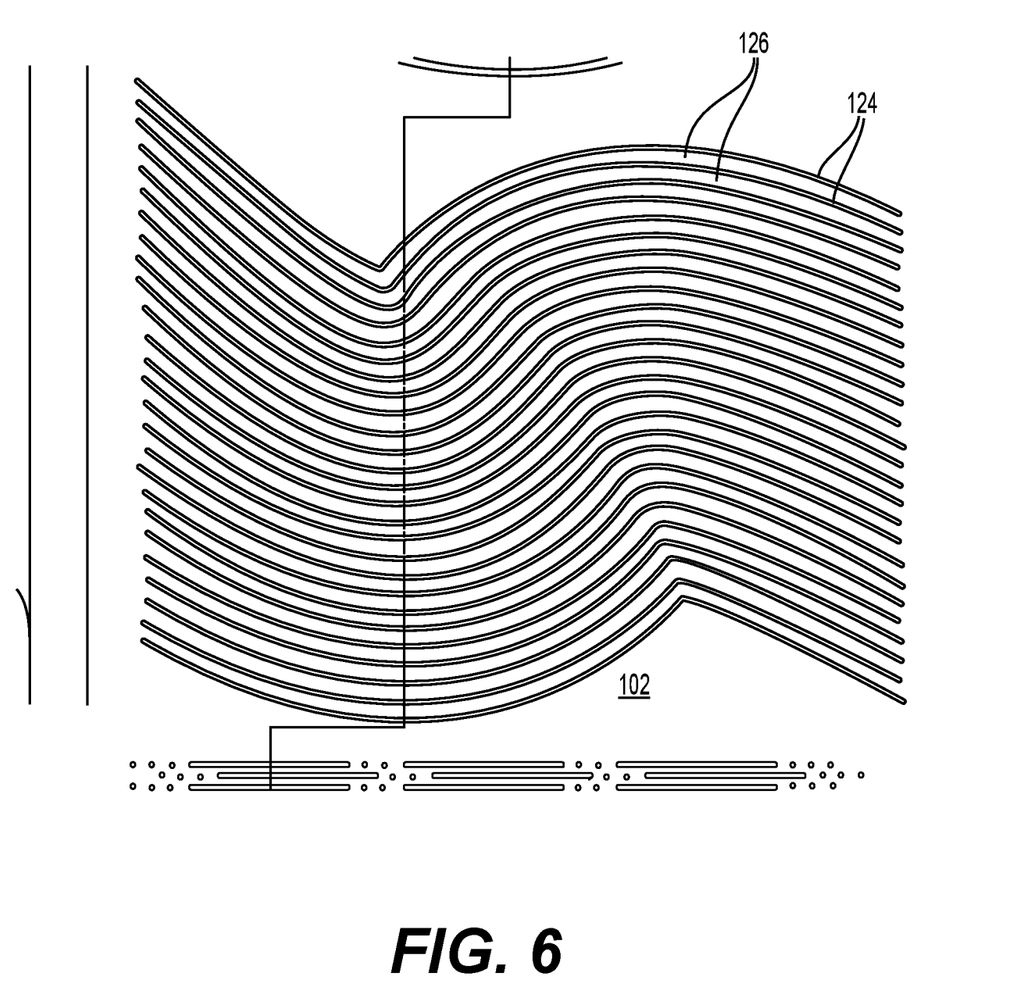
FIG. 6 shows a front view of the squiggle/S-shaped (free form) pattern shown in the perspective view of FIG. 1.

FIG. 6 is a front view of these S-shaped patterns shown from the front (from the same side as the perspective view of FIG. 1). The operation of the middle arrangement 106 is very similar to what is described for the upper arrangement 104. More specifically, the broken out magnified cross section shown in FIG. 5 would be equally accurate for a similar broken out section taken from Section 3'-3' taken from the middle arrangement 106 in FIG. 1. Here, however, instead of the focal point of the optical elements being a substantial circle, the focal point would be S-shaped.

Figure 7A:
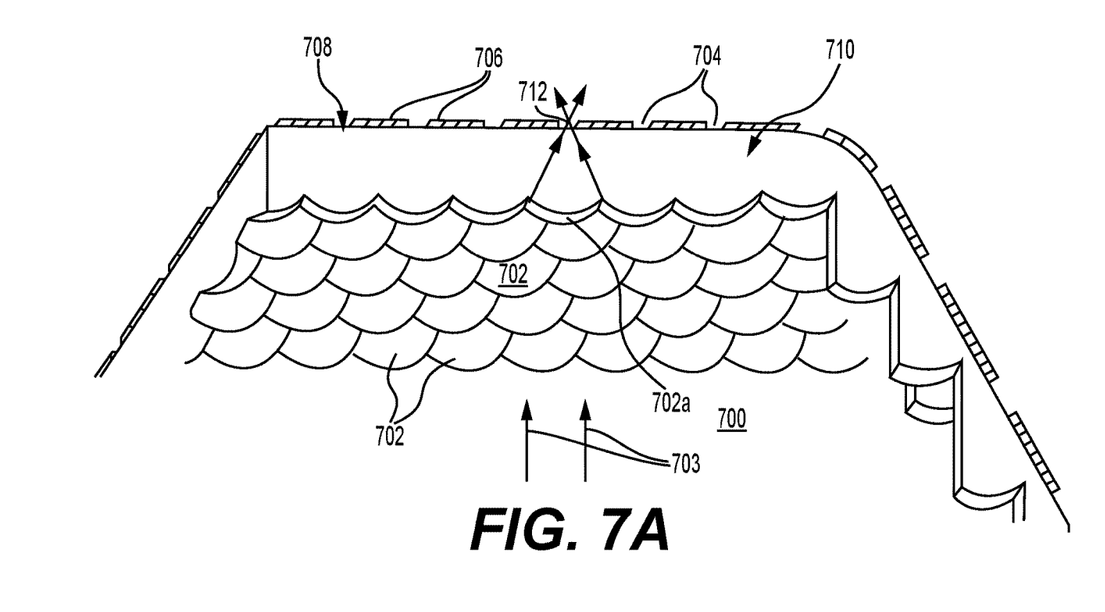
FIG. 7A reveals a view from inside a vehicle light chamber where optical elements are focused on apertures, which can be seen in FIG. 7B which is a broken out view from the outside of the light.
Figure 7B:
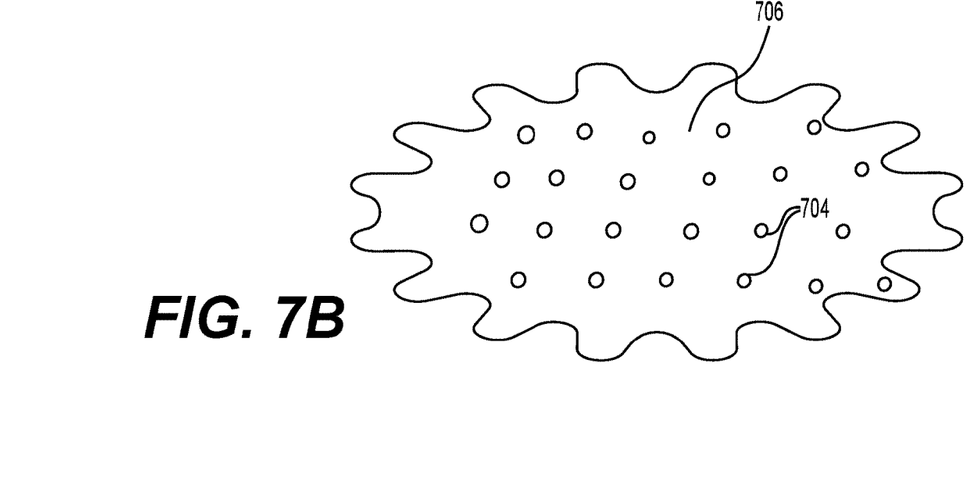

It should be noted, that although the embodiments discussed so far are directed to circular (arrangement 104) or S-shaped (arrangement 106) lines, in other embodiments optical elements are used to focus light through apertures formed in opaque paints or coatings to accomplish similar functional objectives. For example, FIG. 7A reveals a view from an inside vehicle light chamber 700 where a plurality of point-focused optical elements 702 (pillow-shaped in the disclosed embodiment) are provided with a collimated source of light 703. Each of optical elements 702 is focused on a corresponding aperture in a group of apertures 704. The broken out view of FIG. 7B shows how these apertures 704 appear on the front of the occlusive paint 706. The apertures 704 are made into a substantially occlusive paint or coating 706 as the paint is being deposited onto the forward face 708 of the lens 710, could be etched out of the painted portions after painting (or coating), or could be created by numerous other methods.

A single optical element 702a can be seen having a focal point 712 existing substantially at a center of corresponding aperture 704a. Each of apertures 704 are sized to be nearly invisible when viewed from a reasonable distance, and the result is that the outer overall appearance of paint 706 (coating) is one of substantial homogeneity (the visibility of the apertures is minimized). Because the light 703 introduced to the optical elements 702 is focused to pass through the apertures 704, the area in which the apertures exist will provide functional lighting for any number of applications.

Figure 8A:
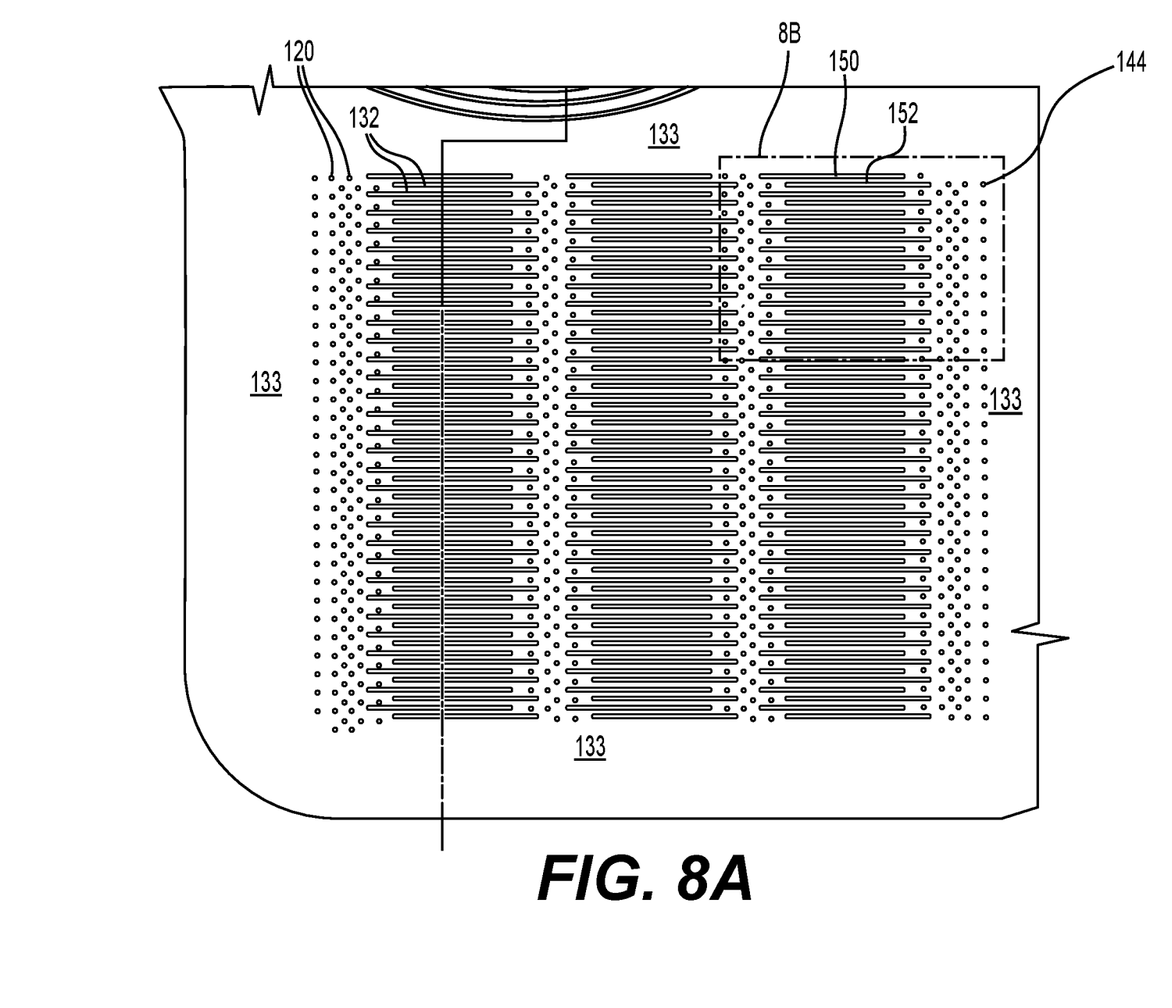
FIG. 8A shows the lower pattern from FIG. 1 where slot arrangements are combined with apertures made through the opaque material to create a desired pattern.
Figure 8B:
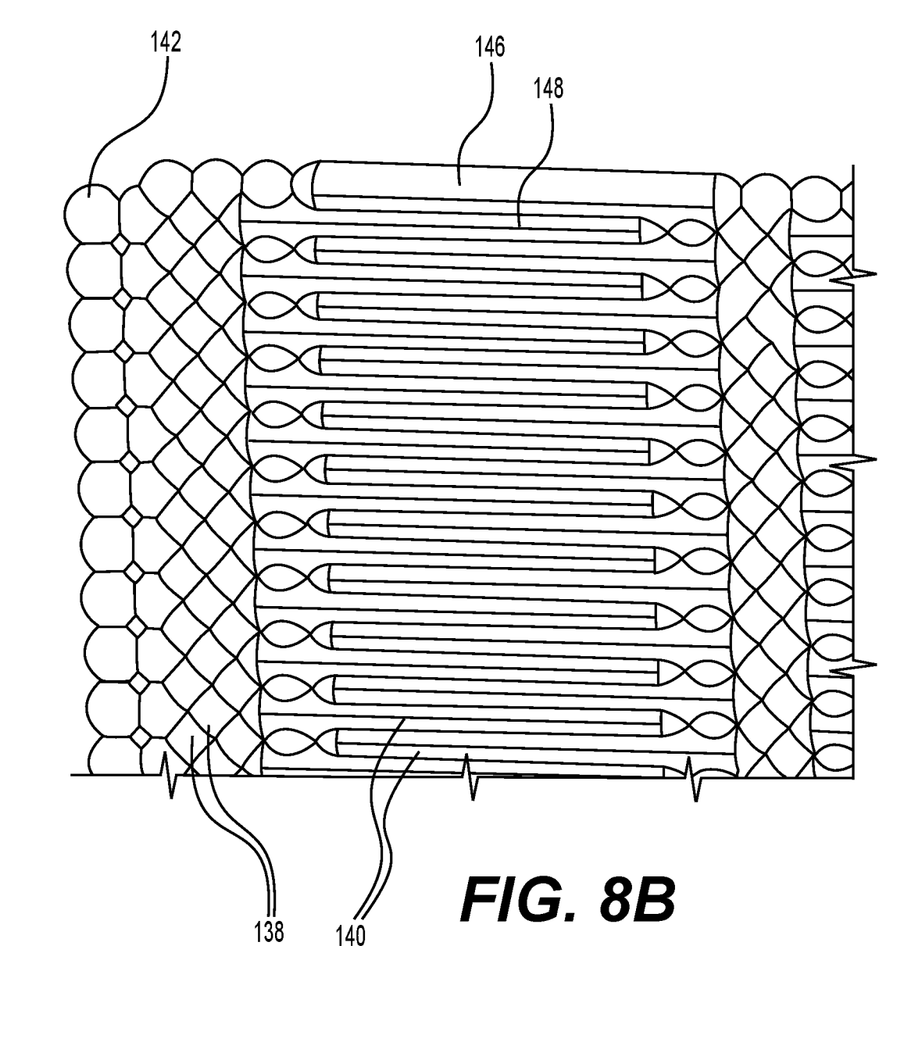
FIG. 8B shows an opposite side of breakout portion 8B revealing the optics established behind the slots and apertures.

Returning again to the embodiment shown in FIGS. 1 and 2, it can be seen that in a bottom arrangement 108, a diverse arrangement including both apertures and slots and flutes and pillow optical elements is disclosed. The details of this arrangement can be seen better in FIG. 8A where a plurality of slots 132 are incorporated into the occluded areas 133, along with a plurality of apertures 130. FIG. 8B shows an opposite side of breakout portion 8B (shown in FIG. 8A). The two views (FIGS. 8A and 8B) enable the matching up of apertures (from plurality 130) and slots (from plurality 132) with various point-focused optical elements 138 and line-focused optical elements 140 (e.g., flutes and pillows), respectively. For example, a point-focused optical element 142 (see FIG. 8B) is focused on a center of an aperture 144 (see FIG. 8A) in the embodiments shown (FIGS. 1, 2, 8A and 8B). Similarly, line-focused optical elements 146 and 148 (see FIG. 8B) are focused on lines 150 and 152 in FIG. 8A. Thus, the focused light is allowed through the apertures 130 and slots 132 to allow for functional lighting, while when the light is not in use, the overall appearance appears as a solid continuous representation of the opaque finish, whatever that finish is (e.g., could be metallic).

Figure 9:
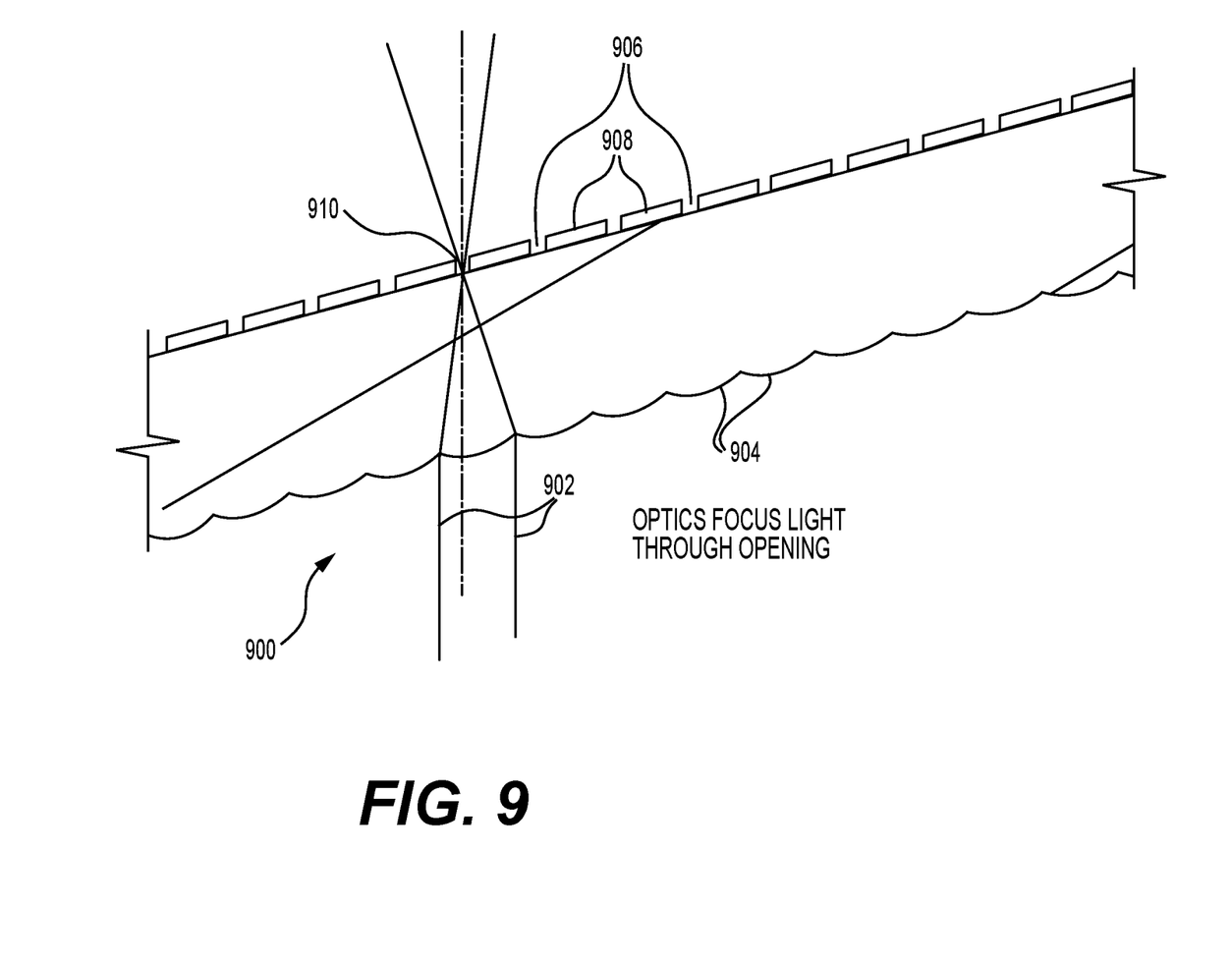
FIG. 9 shows a cross section of an angled portion of a lens which has been configured to have slots or apertures made therethrough.

FIG. 9 shows a cross section of an angled portion 900 of a lens which has been configured to have slots or apertures made therethrough. For example, the FIG. 9 arrangement might be incorporated into the angled side of lens 110 (see FIG. 1). As can be seen from FIG. 9, collimated light 902 is encountered by a plurality of optical elements 904, each of which is associated with either an aperture, slot, or some other opening 906 configured into the opaque material 908 existing on the lens. Again here, the optical elements 904 focus the collimated light towards a point 910 existing in the center of the opening created.

Figure 10:
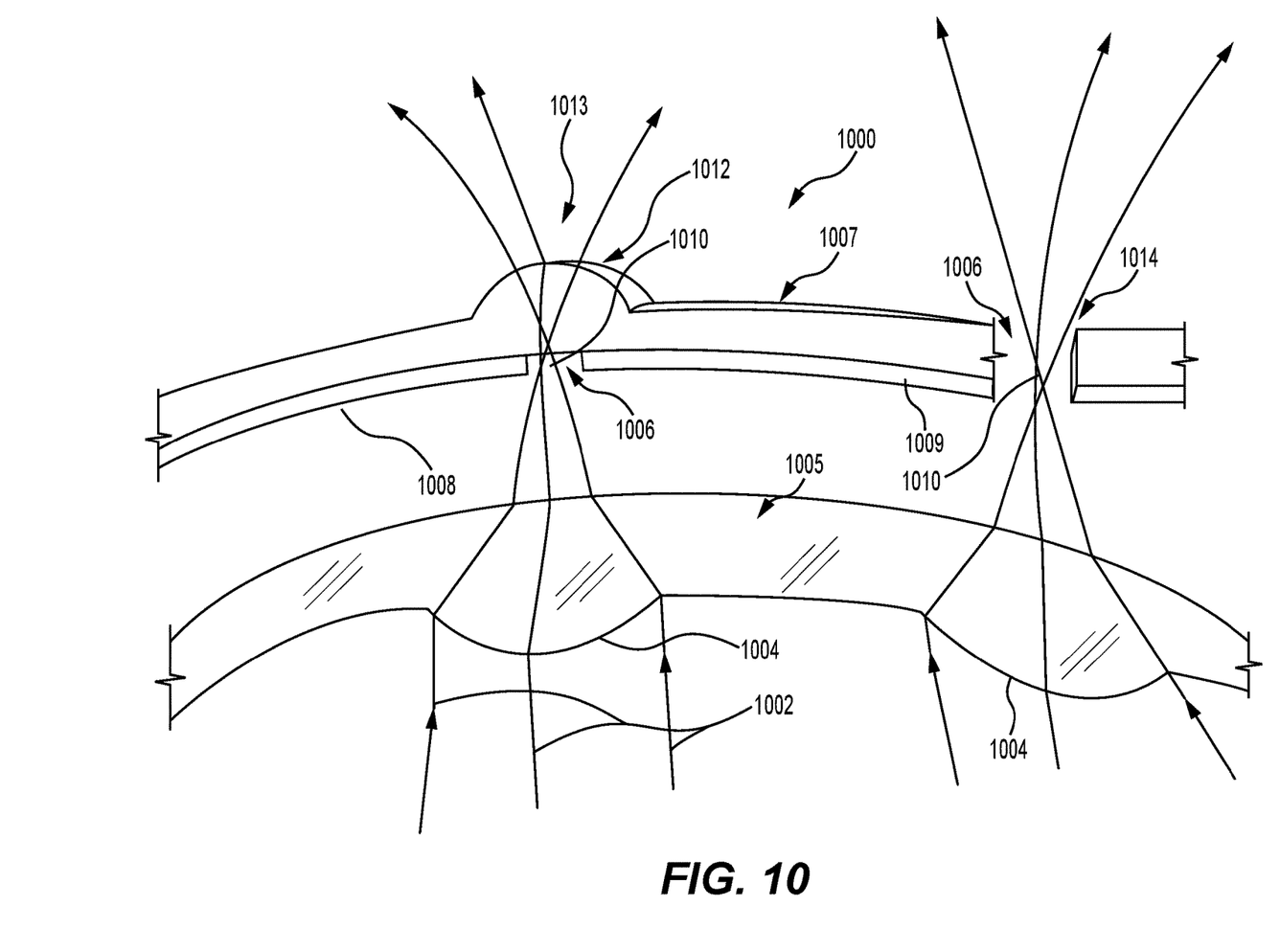
FIG. 10 shows a cross section of an additional alternative dual-lens embodiment using slots or apertures made therethrough.

FIG. 10 shows a cross section for an additional embodiment 1000. In this embodiment a source of collimated light 1002 is acted on by a plurality of optical elements 1004 existing on the side of an interior first lens 1005 closest to the light source (not shown). An outer second lens 1007 is located outside the first lens 1005 relative to the light source. A plurality of apertures (slots, holes) 1006 are made into an opaque coating/paint 1008 that is disposed on the interior surface 1009 of the outer lens 1007. The collimated light acted on by the optical elements 1004 of the first lens 1005 is focused on an area or point 1010 inside the aperture 1006. Thereafter, a plurality of optical elements 1012 further operate to control the light (e.g., create spread, diffuse, focus, etc.). Optionally, in the alternative or in addition to the areas including optical elements 1012 (in an arrangement 1013), a simple bare opening arrangement 1014 can be utilized to merely pass the light through. Although arrangement 1014 discloses the second lens material at the hole 1006 removed, it is also possible that the transparent material not be removed, but that the hole is created only by the removal of the opaque paint at that location. It should also be understood that although the FIG. 10 embodiment shows both aperture arrangements 1013 and 1014 in the same figure, embodiments could exist where all the apertures have optical elements (e.g., like arrangement 1013), or where all of the apertures are like the one shown for the simple opening arrangement 1014.

The widths of each of the slots, holes, and other disclosed light-allowing apertures have been chosen to allow the focused light there through, but the widths are at the same time minimized such that from a reasonable distance (or even close up in some instances), the occluded (or filtering) coating portions will appear as uniform (e.g., metalized in some embodiments; e.g., brushed aluminum) when the lamp is not illuminated. In other embodiments, the occluded (or filtered) coating portions are configured to blend into the surrounding areas of the vehicle when the lamp is off. Regardless, the arrangement appears to be substantially uniform. For slots, the widths would be the distance across the aperture. For holes, the width is herein interpreted as the diameter of the aperture. The widths, in embodiments, are sized to create the desired appearance (albeit illusory) of uniformity (or homogeneity). In embodiments, the widths would be in the range of 10-250 microns. In more specific embodiments, the widths would be in the 10-100 micron range. In other embodiments, where greater uniformity is a priority, an artisan might size the widths to be less than 20 microns, a level at which apparent coating homogeneity is maintained even near vantagepoints. In some other embodiments, width sizing of about 63 microns is ideal for the purpose of conforming with an off the shelf optical element configuration. Regardless, embodiments should not be limited to any particular aperture width size unless otherwise specified in the claims.

Combinations of Features

Features described above as well as those claimed below may be combined in various ways without departing from the scope hereof. The following examples illustrate some possible, non-limiting combinations:

(A1) A system includes a light source directed into a light modifier, the light modifier including a plurality of optical elements on a side of the modifier that faces the light source, and an opaque or translucent covering on an opposite side of the modifier; a plurality of diversely-configured apertures located on the opposite side of the modifier, each aperture having a width; and the plurality of optical elements is configured to direct light through each of the plurality of diversely-configured apertures, respectively, for the purpose of accomplishing a lighting function.

(A2) The system denoted as (A1), wherein one of the plurality of diversely-configured apertures is a slot, and a corresponding optical element is a flute configured to focus light through the slot.

(A3) The system denoted as of claim (A1) wherein one of the plurality of diversely-configured apertures is a hole, and a corresponding optical element is configured to focus light on an area or point in the hole.

(A4) The system denoted as (A1) wherein: a first aperture of the plurality of diversely-configured apertures is a slot, and a first optical element in the plurality of optical elements is a flute configured to focus light through the slot; and a second aperture of the plurality of diversely-configured apertures is a hole, and a second optical element in the plurality of optical elements is configured to focus light through the hole.

(A5) The system denoted as any of (A1) through (A4) wherein the light source and the light modifier are incorporated into a vehicle light.

(A6) The system denoted as any of (A1) through (A5) wherein the vehicle light is a signal light.

(A7) The system denoted as any of (A1) through (A6) wherein the plurality of optical elements and the plurality of diversely-configured apertures enable a first mode, wherein the light source is active and light is transmitted through the plurality of apertures, and a second dark mode wherein the modifier creates a solid appearance.

(A8) The system denoted as any of (A1) through (A7) wherein the solid appearance is metallic.

(A9) The system denoted as any of (A1) through (A8) wherein the solid appearance resembles brushed aluminum.

(A10) The system denoted as any of (A1) through (A9) wherein the plurality of optical elements and apertures include diverse patterns creating different optical effects at different locations on the modifier.

(A11) The system denoted as any of (A1) through (A10) wherein the plurality of diversely-configured apertures includes at least one curved slot, and the plurality of optical elements includes at least one curved flute following the curved slot, the curved flute being configured to emit light through the curved slot.

(A12) The system denoted as any of (A1) through (A11) wherein the optical elements form concentric circles and the apertures are formed as concentric circles on the opposite side of the modifier.

(A13) The system denoted as any of (A1) through (A12) wherein the optical elements and apertures form an upper portion of a taillight, the aperture filters the light to the color red, and the system is configured to operate as a brake light.

(A14) The system denoted as any of (A1) through (A13) wherein the optical elements and apertures are S-shaped.

(A15) The system denoted as any of (A1) through (A14) wherein the optical elements and apertures form a central yellow-colored portion of the system, and the central yellow-colored portion is configured to operate as a turn signal.

(A16) The system denoted as any of (A1) through (A15) wherein the width of the apertures is in the range of 10-250 microns.

(A17) The system denoted as any of (A1) through (A16) wherein width of the apertures is in the range of 10-100 microns.

(A18) The system denoted as any of (A1) through (A17) wherein the apertures have a width less than 20 microns.

(A19) The system denoted as any of (A1) through (A18) wherein the apertures have a width of about 63 microns.

(B1) A vehicle lamp including: an inner lens including an inner optical element; an outer lens including an opaque or translucent covering on an inside surface; an aperture formed in the opaque or translucent covering on the outer lens, the inner optical element configured to focus light through the aperture.

(B2) The vehicle lamp denoted as (B1) wherein the outer lens includes an outer optical element on the outside surface of the outer lens.

(B3) The vehicle lamp denoted as (B1) wherein the aperture extends through the opaque or translucent covering and through the outer lens.

While the present disclosure has shown and described exemplary embodiments, it will be understood by those of ordinary skill in the art that various changes in form and details may be made therein without departing from the spirit and scope of the present disclosure, as defined by the following claims.

The invention claimed is:

1. A system comprising:
   a light source directed into a light modifier, the light modifier including: (i) a first plurality of optical elements, and, (ii) a second plurality of optical elements both existing on a side of the modifier that faces the light source, and an opaque or translucent covering on an opposite side of the modifier;
   a first plurality of apertures and a second plurality of apertures both located on the opposite side of the modifier,
   the first plurality of optical elements configured to conform to a first shape of and direct light through each of the first plurality of apertures;
   the second plurality of optical elements configured to conform to a second shape of and to direct light through each of the second plurality of apertures, the second shape being different from the first shape;
   the first and second pluralities of optical elements and the first and second pluralities of apertures together configured to create one or more lighting functions.

2. The system of claim 1 wherein each of the first plurality of apertures is a slot, and a corresponding optical element in the first plurality of optical elements is a flute configured to focus light through the slot.

3. The system of claim 1 wherein each of the second plurality of apertures is a hole, and a corresponding optical element in the second plurality of optical elements is configured to focus light on an area or point in the hole.

4. The system of claim 1 wherein the light source and the light modifier are incorporated into a vehicle light.

5. The system of claim 4 wherein the vehicle light is a signal light.

6. The system of claim 5 wherein the plurality of optical elements and the plurality of diversely-configured apertures enable a first mode, wherein the light source is active and light is transmitted through the plurality of apertures, and a second dark mode wherein the modifier creates a solid metallic appearance.

7. The system of claim 6 wherein the solid metallic appearance resembles brushed aluminum.

8. The system of claim 1 wherein the first plurality of optical elements and the first plurality of apertures are at a different location on the modifier relative to, and create a different optical effect than the second plurality of optical elements and the second plurality of apertures.

9. The system of claim 1 wherein the first plurality of diversely-configured apertures includes at least one curved slot, and the first plurality of optical elements includes at least one curved flute following the curved slot, the curved flute being configured to emit light through the curved slot.

10. The system of claim 1 wherein the first plurality of optical elements form concentric circles and the first plurality of apertures are formed as concentric circles on the opposite side of the modifier.

11. The system of claim 1 wherein the first plurality of optical elements and first plurality of apertures together form an upper portion of a taillight, the first plurality of apertures filters the light to red, and the system is configured to operate as a brake light.

12. The system of claim 1 wherein the first plurality of optical elements and the first plurality of apertures are S-shaped.

13. The system of claim 1 wherein the first plurality of optical elements and first plurality of apertures together form a central yellow-colored portion of the system, and the central yellow-colored portion is configured to operate as a turn signal.

14. The system of claim 1 wherein the width of the apertures in the first plurality of apertures is in the range of 10-250 microns.

15. The system of claim 14 wherein the width of the apertures in the first plurality is in the range of 10-100 microns.

16. The system of claim 15 wherein the apertures in the first plurality have a width less than 20 microns.

17. The system of claim 16 wherein the apertures in the first plurality have a width of about 63 microns.

18. A vehicle lamp comprising:
   a light source directed towards a light modifier;
   a light-receiving side of the modifier that faces the light source and an opposite side of the modifier;
   a plurality of flutes configured into the light-receiving side of the modifier, each flute directing a line of light through a respective slot of a plurality of slots defined into an opaque covering on the opposite side of the modifier; and
   a plurality of point-focused optical elements configured into the light-receiving side of the modifier, each point-focused optical element flute directing light through a respective hole of a plurality of holes defined into the opaque covering on the opposite side of the modifier.

19. The vehicle lamp of claim 18 wherein the plurality of flutes and the plurality of slots are curved.

20. The vehicle lamp of claim 18 wherein the plurality of flutes and the plurality of slots are substantially linear.

* * * * *